United States Patent

[11] 3,617,639

[72] Inventor Abe Propper
Madison, N.J.

[21] Appl. No. 778,957
[22] Filed Nov. 26, 1968
[45] Patented Nov. 2, 1971

[73] Assignee Quindar Electronics, Inc.
Springfield, N.J.

[54] CENTRALLY MONITORED TELEMETRY SYSTEMS

11 Claims, 5 Drawing Figs.

[52] U.S. Cl. 179/2 DP
[51] Int. Cl. H04m 11/06
[50] Field of Search 179/2 DP, 5, 175, 175.2, 175.2 C, 2 R; 340/181, 201, 150, 214

[56] References Cited

UNITED STATES PATENTS

| | | | |
|---|---|---|---|
| 3,344,401 | 9/1967 | MacDonald | 340/172.5 |
| 3,475,751 | 10/1969 | Sontag | 340/416 |
| 3,420,958 | 1/1969 | Ewin | 179/18 |
| 3,351,919 | 11/1967 | Milford | 340/172.5 |
| 3,317,673 | 5/1967 | South | 179/5 |
| 2,583,088 | 1/1952 | Clutts | 177/353 |
| 3,087,991 | 4/1963 | Anderson | 179/5 |

*Primary Examiner*—Kathleen H. Claffy
*Assistant Examiner*—Thomas D'Amico
*Attorney*—Morse, Altman & Oates

ABSTRACT: The present invention relates to a system for the central monitoring of telemetry and control systems, and, more particularly, to the central monitoring of master and remote stations of telemetry systems. The invention contemplates means for enabling the information transmitted and received by master and remote stations of a telemetry system to be transmitted to and received by a central monitoring station whereby the information is recorded by a recording means and analyzed to check the operation of the telemetry system without necessitating direct checking of the individual components of the system, i.e., the master and remote stations thereof, which are geographically located at installations remote from that of the central monitoring station. One means contemplated for the transmission of information or, more properly, data to the central monitoring station is by telephone lines in conjunction with acoustical coupling devices connected among the telephone lines, the operating stations of the telemetry system and the central monitoring station. The central monitoring station also is adapted to communicate vocally with the operating stations in order to facilitate any necessary repair.

INVENTOR.
Abe Propper
BY
Morse, Altman & Oates
ATTORNEYS

INVENTOR.
Abe Propper
BY
Morse, Altman & Oates
ATTORNEYS

CENTRALLY MONITORED TELEMETRY SYSTEMS

BACKGROUND OF THE INVENTION

The present invention relates to a novel apparatus and method for monitoring and diagnosing problems encountered in a telemetry system, both in the master stations and the remote stations. More particularly, the invention relates to the provision of a centrally located monitoring and testing station which is properly equipped to receive data from and transmit data to the master and remote stations of a telemetry system, wherein the data can be directly analyzed for the purpose of ascertaining the proper functioning and any malfunctioning of the components of the system. Thus, the cause of any malfunction initially can be ascertained at the central station, which is remote from the malfunctioning equipment, and subsequently can be corrected by instructions to personnel at the equipment site.

In present telemetry and control systems, the practice for correcting malfunction of the equipment is to conduct trouble-shooting procedures at the actual geographical location of the equipment. If such procedures prove to be unsuccessful, it is customary to remove the equipment from its geographical location and return it to the manufacturer for inspection and repair. This procedure is time consuming, expensive and inefficient, requiring duplication of test and repair equipment and duplication personnel due to travel time.

SUMMARY OF THE INVENTION

Accordingly, it is the primary object of the present invention to provide a system and method for monitoring, detecting and analyzing, at a central station, any failure or malfunction at any operating station, whether master or remote, of a geographically dispersed telemetry system. In one embodiment of the invention, the central station is provided for monitoring, detecting and diagnosing failures and malfunctions in telemetry stations characterized by bilateral telemetry data transmission and reception involving acoustical tones via radio, microwave or telephone links. The central monitoring system is connected to each of the individual telemetry stations by means of such links by acoustic coupling devices. The central monitoring station includes, as well as acoustical coupling devices, a tape recorder, a frequency selective unit, a chart recorder and a test unit. The test unit includes a matching operating system that is identical to the system being monitored and a reference signal generator. The telemetry station being monitored is connected by an acoustical coupling device to a communications link of the aforementioned type in the event of failure or malfunction of the telemetry station. The communications link then is used to call the receiver of the central monitoring station, which receiver is connected via an acoustical coupling device to the suitable switching in the monitoring station. This switching is connected to a test apparatus which is capable of actuating this switching to permit the data from the telemetry station to be connected directly to a frequency selective unit and/or indirectly to this unit via a tape recorder. The output of the frequency selective unit then is fed to a chart recorder for visual analysis and also to the test apparatus for electrical analysis. The test apparatus includes a reference signal generator for transmitting known frequency tones to the monitored telemetry station for retransmission to the test apparatus for evaluation.

Other objects of the present invention will in part be obvious and will in part appear hereinafter.

The invention accordingly comprises the system, its components and their relationships, which are explained in the following disclosure, the scope of which will be indicated in the appended claims.

BRIEF DESCRIPTION OF THE DRAWINGS

For a fuller understanding of the nature and objects of the present invention, reference is made to the following specific description, taken together with the accompanying drawings wherein.

DETAILED DESCRIPTION

Figure 1:
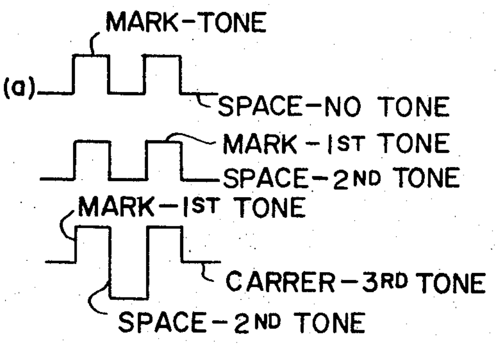
FIG. 1 illustrates certain principles applicable to the present invention.

Generally, telemetry and control systems of the type disclosed herein involve so-called tone signalling, which involves the transmission of one or more pulsed tones or signals of particular frequency through a single line or link. A tone channel consists of a tone transmitter and a tone receiver. The tone transmitter is simply an audio signal generator whose frequency is precisely controlled and which is arranged for on-off or frequency shift keying. The tone receiver simply is tuned to intercept a specific audio frequency signal, which is converted to a DC signal and is used to control a mechanical relay or electronic switch. There are three common types of tone channels, all of which are applicable to the system of the present invention as described below. In an on-off (AM) tone channel (FIG. 1*a*), the transmitter is keyed on and off by switch contacts or DC voltage and the receiver responds to the presence and absence of a tone at a specific frequency by opening and closing relay contacts or delivering a DC voltage. In a frequency-shift-keyed (FSK) tone channel (FIGS. 1*b* and 1*c*), the frequency of the tone transmitter is shifted by switch contacts or DC voltage, and the receiver responds to a shift from one specific frequency to another specific frequency by energizing a relay or delivering a DC voltage.

There are two basic types of FSK systems. In a two state FSK tone channel (FIG. 1*b*), a tone signal is transmitted at all times, on one or the other of the two frequencies. When the input keying contacts are open, or the DC keying voltage is absent, a tone is transmitted on the so-called carrier frequency. When the input keying contacts are closed, or the DC keying voltage is present, a tone is transmitted on another frequency and the tone at the carrier frequency is silenced. The distant tone receiver senses the presence and absence of both tone frequencies. In a three state FSK tone channel (FIG. 1*c*, any one of three tones is transmitted. The so-called carrier frequency tone is transmitted when the input keying contacts are open, or the DC keying voltage is absent. With a pair of input keying contacts closed, the tone frequency is shifted upward or downward in frequency. When these contacts are open and another pair of contacts are closed, the tone frequency is shifted in the opposite direction from the carrier or center frequency. Or, in lieu of contacts, a DC voltage is used to shift the tone in one direction, and a DC voltage is used to shift the tone in the opposite direction. The distant tone receiver senses the presence and absence of all three tone frequencies. Intelligence is transmitted over an on-off channel by keying the tone on and off, "on" representing a "mark" signal, and "off" representing a "space" signal. In one type of control system, the mark signal is used to activate a distant device and a space signal to deactivate it. Or, in an alarm system, the absence (space signal) of tone is used to denote an off-normal condition or vice versa. Quantitative information in an AM system is transmitted by keying the tone to produce specific numbers of short (dot) or long (dash) pulses, or by varying the duration of the mark or space signals, or both. At the distant end of the circuit, a telemeter receiver, keyed by a tone receiver, indicates the measured value. In a two state FSK tone channel, the mark and space signals are available, as in an on-off channel. In a three state FSK tone channel, there are three tones available, of which only two are used, namely the upper and lower tones. The carrier or center tone is used only as an alarm signal to denote a malfunction or absence of intelligence for transmission. In typical control system applications, the center frequency normally is transmitted. The mark signal, for example, is used to energize a green light or to run a motor in one direction, and the space signal to energize a red light or to run the motor in the reverse direction.

In the illustrated embodiment of the present invention, the tone signals are transmitted over leased telephone lines. For example, 30 or more tone channels can be transmitted over what is known as a 300–3,000 c.p.s. voice circuit. These tone signals can be transmitted simultaneously over a circuit carrying power or other intelligence. For example, filters are used in a telephone circuit to permit transmission of tone signals within a notch inside the voice band, or by limiting the upper end of the speech transmission path and transmitting tones at frequencies above those of the voice signals. Either way, the tone signals are prevented from interfering with voice transmission. By using electronic scanners, each tone channel can be multiplexed on a time division basis to handle a large number of functions. Common details of typical telemetering components are shown in U.S. Pat. No. 3,339,193, issued on Aug. 29, 1967 in the name of Philip L. Epstein for Telemetering Apparatus. Accordingly, the following description emphasizes relationships among components rather than details of any component per se.

Figure 2:
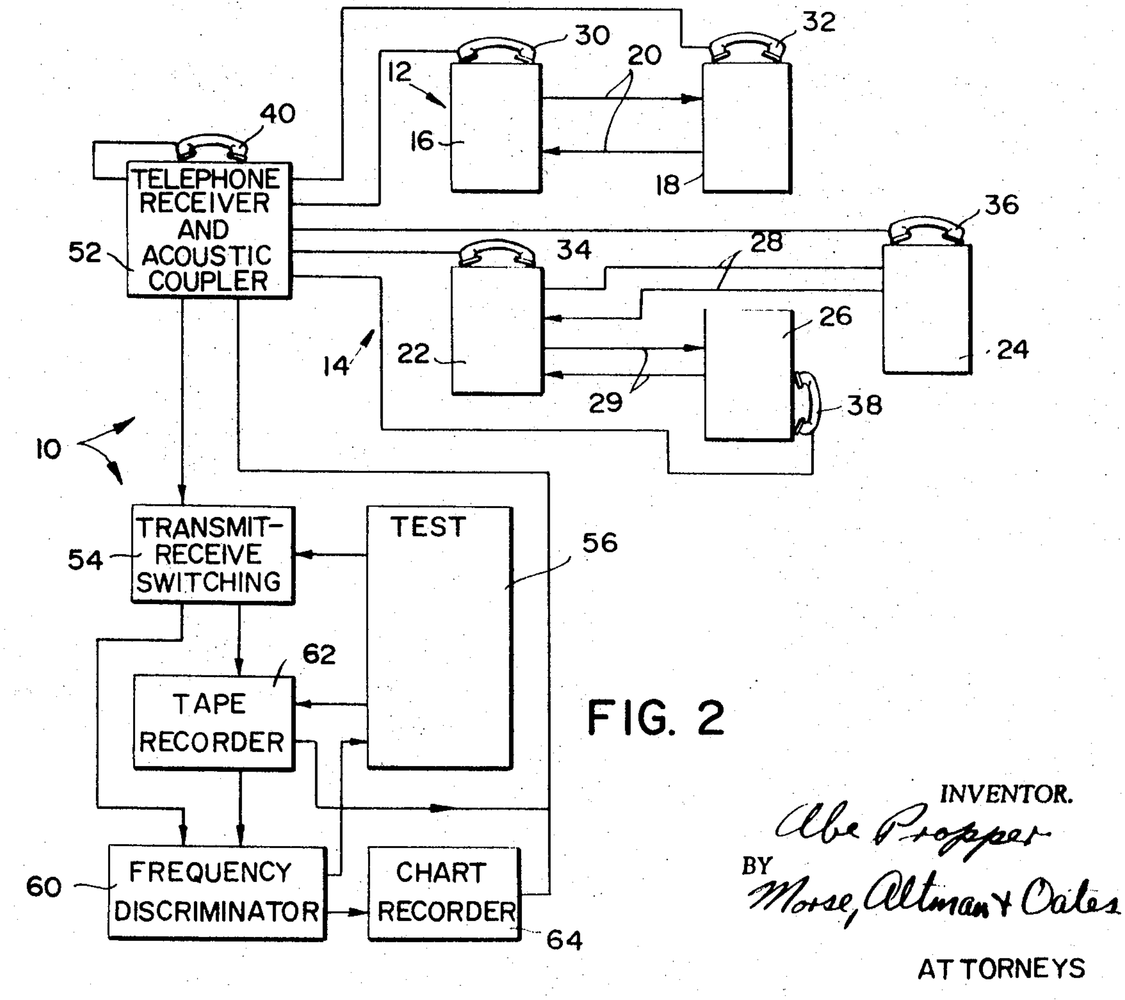
FIG. 2 is a block diagram, showing the interconnection of the central monitoring station of the present invention with a plurality of geographically dispersed telemetry systems having varying numbers of stations.

Referring now to the remaining drawings, and more particularly to FIG. 2, there is shown a central monitoring station, designated generally by 10, and first and second telemetry systems 12 and 14, respectively. Telemetry system 12 includes a master station 16 and a remote station 18, which are interconnected by means of a data link 20 adapted for bilateral telemetry data transmission. Telemetry system 14 includes a master station 22 and remote stations 24 and 26. The master station 22 is connected with remote stations 24 and 26 respectively by means of data links 28, 29 which are adapted for bilateral telemetry data transmission. Stations 16, 18, 22, 14 and 26 have telephones 30, 32, 34, 36 and 38 associated therewith, respectively. Stations 16, 18, 22, 24 and 28 are of typical design having transmitting, receiving and discriminating components of the types which are referred to above and which will be described more specifically in connection with FIGS. 4 and 5.

Figure 3:
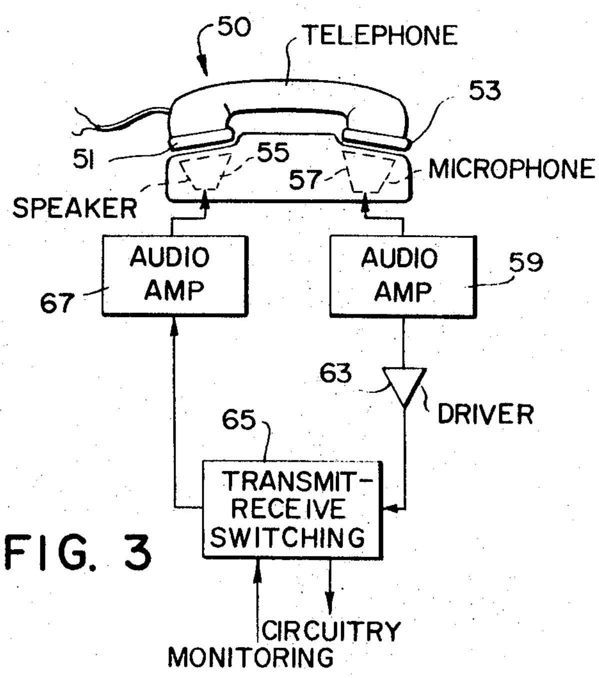
FIG. 3 is a block diagram illustrating how components of the telemetry system are coupled acoustically to the central station.

In the illustrated example, when a failure or malfunction occurs at master station 16, telephone 30 is used by personnel at master station 16 to call personnel at telephone 40 in central monitoring station 10. Then the signals generated at master station 16 are transmitted on the telephone link so established to central station. At both the master (as well as the slave) and the central stations are acoustic coupling devices of the type shown in FIG. 3. This acoustic coupling device includes a telephone headset 50 having a microphone 51 and a speaker 53, each conventionally including an electroacoustic transducer and an acoustic diaphragm. Microphone 51 is coupled to a speaker 55 and speaker 53 is coupled to a microphone 57. Components 55 and 57 each conventionally includes an electroacoustic transducer and an acoustic diaphragm. Signals received at the central monitoring station are directed from speaker 53, through microphone 57, an audio amplifier 59 and a driving amplifier 63 to the transmit-receive switching 65 of the monitoring station. Signals transmitted from the central monitoring station are directed therefrom through transmit-receive switching 65, an audio amplifier 67 and speaker 55 to microphone 51.

At central station 10, the data received by telephone 40 is coupled via acoustic coupler 52 to switching device 54, which is operated by a test apparatus designated generally by 56, via suitable interconnections. The switching device is operable to direct the data to a frequency selective unit 60 for immediate analysis, or to direct the data to a tape recorder 62 for delayed analysis or to perform both functions simultaneously. In one form switching device 54 includes simple manual switching units, by which an operator selects one or more of the testing devices available for reception of incoming signals. In another form of switching device 54, this function is preprogrammed and automatically effectuated upon receipt of a signal from one or more of the operating stations. The data from the tape recorder 62 also is fed to the frequency selective unit 60. The output from the frequency selective unit 62 is fed to a chart recorder 64 and to the test apparatus 56, or to either one of them, selectively. The output of the chart recorder 64 is a visual display of the data presented thereto and, in effect, is a cardiogram of the station being monitored. The output fed to the test apparatus 56, which includes equipment identical to that of the telemetry station 16, permits apparatus 56 to pinpoint the exact cause of any malfunction existing in the telemetry station being monitored.

Apparatus 56 also includes a reference signal generator capable of producing tones at the operating frequencies of telemetry station 16, which tones are fed from apparatus 56 to acoustical coupling device 52 by means of an interconnection for transmission to the telemetry station via the telephone link. These tones then are retransmitted by telemetry station 16 and ultimately received by apparatus 56 for comparison with the original tones produced thereby. In one form, such comparison is effected by a comparator including voltage matching circuitry and output information display. The tape recorder also is capable of retransmitting the data recorder by feeding this data back to the acoustical coupling device 52 by means of an interconnection. This operation is controlled by test apparatus 56 via another interconnection. The frequency selective unit 60 is either variable or comprises a plurality of fixed devices in order to provide selective coupling of the desired frequencies. The fixed units, which are employed in one form of frequency selective unit 60, operate on the basis of any of the tone coding systems discussed above.

Figure 4:
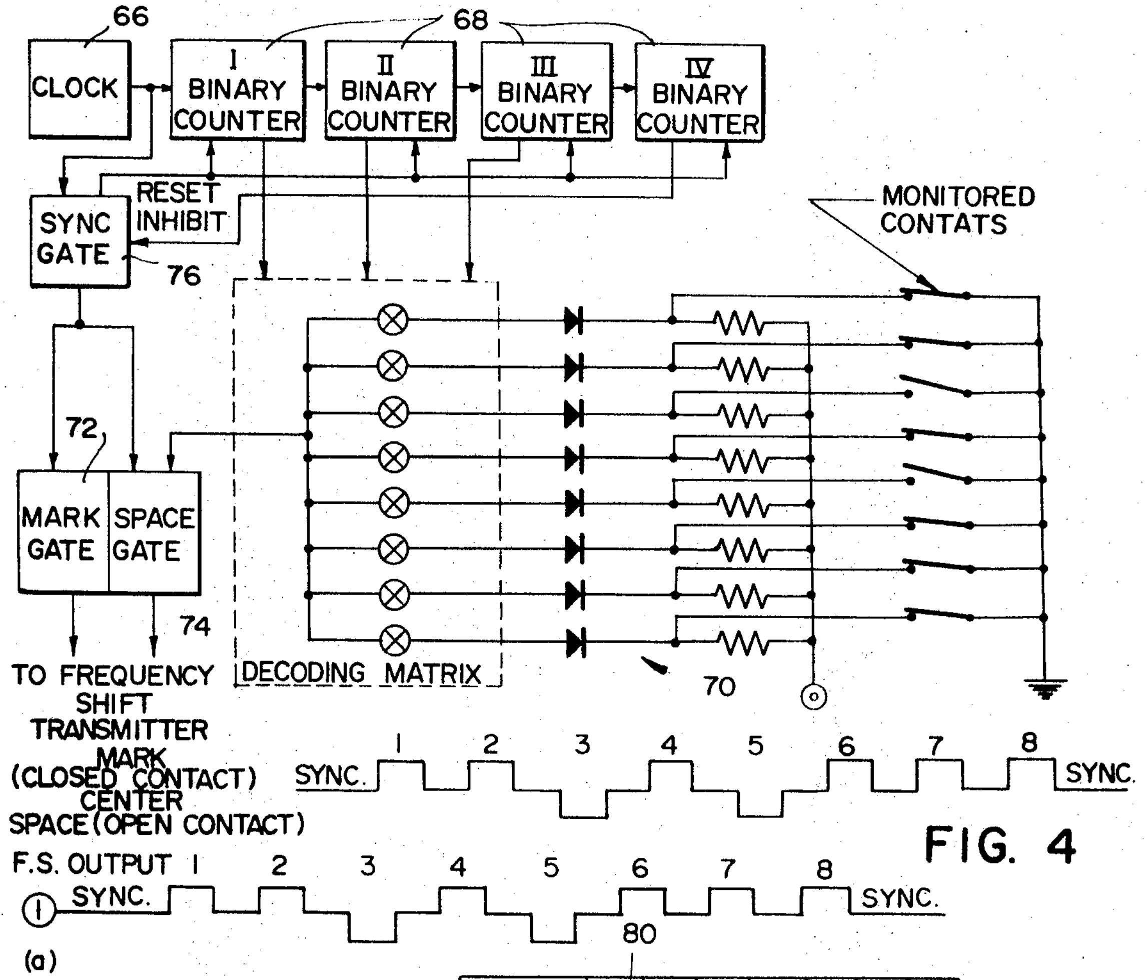
FIG. 4 is a partially schematic block diagram of a telemetry transmitter, constituting a component of a type monitored in accordance with the present invention.
Figure 5:
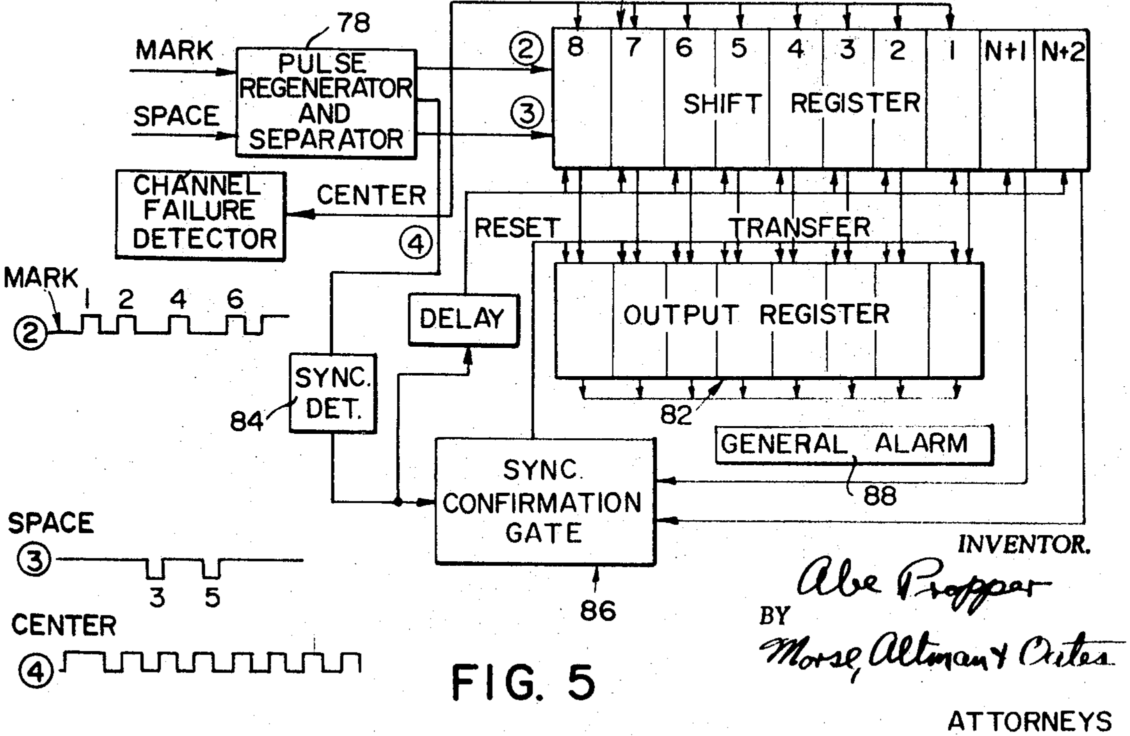
FIG. 5 is a partially schematic block diagram of a telemetry receiver, constituting a component of a type monitored in accordance with the present invention.

Each of the monitor, master and remote stations referred to above conventionally incorporates scanning and tone handling circuitry of the types shown in FIGS. 4 and 5. In particular test unit 56 incorporates circuitry for test comparison that is identical with like circuitry in the master and remote stations. This circuitry continuously and sequentially samples the condition of remote switches or voltages. This information is encoded in the form of a pulse train and transmitted to any appropriate receiver unit where the information is synchronously decommutated and directed to the appropriate display or relay register. The system transmits a synchronizing signal once each scan so there is no dependence on power line synchronization or ultra stable oscillators. The information contained in each scan is held in a shift register and is not displayed until the sweep has been completed and synchronization confirmed.

With reference to FIG. 4, a timing pulse generator 66 pulses a series of binary counters 68. At each count, a decoding matrix 70 sequentially gates either a negative or ground potential from the monitored contacts to mark or space gates 72, 74. The negative potential allows the square wave clock pulses from a sync gate 76 to pass through the space gate, thus keying the space frequency of an FS transmitter. The ground potential opens the mark gate, allowing the clock pulses to key mark frequency. When the fourth binary counter is pulsed, sync gate is closed 76, preventing the passing of the corresponding clock pulse. This action results in the absence of a mark or space which can then be recognized as the sync signal at the receiver.

With reference to FIG. 5, the FS receiver output is fed to a pulse generator and separator 78, providing the ONE's for marks and ZERO's for spaces for a shift register 80. Due to a special code checking feature the N+1 and N+2 stages of the shift register always will have a ONE and a ZERO respectively when the sync signal is received if the code reception has been correct. Under these conditions, the information in the shift register is transferred to the output register 82 which in one form is a lamp display and in another form is a relay bank. The shift register then is reset and the process repeats. If the code checking requirements are not satisfied at a sync detector and sync confirmation gate 85, the shift register is reset and the process repeats without any transfer of information from the shift register to the output register. A general alarm lamp 88 lights and the relay contacts close upon reception of an alarm. The contacts in one form sound an audible alarm. A toggle switch is provided for opening the alarm relay circuit without affecting the general alarm lamp display. When the fault is cleared, the lamp returns to normal but the relay circuit again is completed so that the audible alarm will call the operator's attention to the fact that the alarm condition has been cleared. The incoming signal at the attended station is constantly monitored to check that pulses are being received. The absence of pulsing causes an alarm to be registered and prevents any change from the last correct display. Pulsing speed is factory adjustable. It is typically adjusted to operate at 15 points per second for operation over a standard narrow band Frequency Shift Channel, but operation at higher speeds are available.

It thus will be apparent that by the use of central monitoring system 10 hereinabove described, failure or malfunctions in remotely located telemetry stations can be simply and easily diagnosed and subsequently corrected at the telemetry stations without necessitating the use of complex equipment and a large number of personnel directly at the actual geographical site of the telemetry station. The enclosed pulse train or steady tone transmitted to station 16 is for checking the operation of their receiving equipment. In supervisory control systems, the decoded information automatically triggers the check back code (on a different frequency) for retransmission to apparatus 56. As in normal operation, different frequencies are utilized to transmit and receive. A steady tone transmitted to station 16 is used to test individual receiver units for operation. Steady tones transmitted from station 16 are checked for frequency accuracy.

Another aspect of the present invention now will be described with reference to FIG. 1 of the drawings. Referring to the telemetry system 12, it is seen that the master station 16 is connected to the remote station 18 by means of the data link 20. If any problem is encountered with the data link 20, telemetry system 12 normally is rendered inoperative or, at best, faulty operation occurs. In the present invention, should a problem be encountered with the data link 20 during working hours, the same is removed from operation by being decoupled from the stations 16 and 18 and the stations are coupled to their respective telephones 30 and 32 by means of acoustical coupling devices of the type described previously in conjunction with FIG. 2. The telephones then are interconnected, a new data link being established over the telephone lines, and the bilateral telemetry data transmission continues via telephone until data link 20 is restored to operation. When no longer needed, the auxiliary telephone interconnection is broken. The auxiliary operation hereinabove described also is available to the telemetry system 14 by means of the telephones 34, 36 and 38. Ordinarily, the aforementioned programming sequence is provided to the customer beforehand so that little time is wasted during working hours. In an alternative system, test equipment at the master and remote stations is programmed under the control of the central station following receipt at the central station of the needed information.

Thus, the present invention provides an auxiliary data transmission link which is readily available for service should the primary data link be rendered ineffective or inoperative. The present invention also provides a means for permitting the telemetry systems to continue bilateral data transmission when the primary data link of the system is rendered ineffective or inoperative. It will be apparent that while preferred embodiments have been shown, there are many changes, modifications and improvements which may be made therein without departing from the spirit, scope and teachings of the present invention as defined in the appended claims.

What is claimed is:

1. A telemetry system having a central monitoring apparatus operatively associated therewith, said telemetry system comprising a plurality of individual telemetry stations, at least one of said stations being a master station and at least one of said stations being a remote station, said central monitoring apparatus comprising means for communicating with said telemetry system to receive data therefrom, means for analyzing said data for ascertaining the operational status of said telemetry system, and a data link for coupling said master and remote station for permitting data transmission therebetween, each of said telemetry stations including a telephone operatively associated therewith, means for selectively connecting said telephones to said associated stations, and means for selectively connecting said telephones of said stations together upon the malfunctioning of said data link, whereby there is provided an auxiliary data link between said telemetry station, each of said telemetering stations including a telephone operatively associated therewith, means for selectively interconnecting each of said telemetry stations with each of said telephone associated therewith, said central monitoring apparatus having a telephone operatively associated therewith, means for connecting said last mentioned telephone with said central monitoring apparatus, and means for selectively connecting said telephones of said telemetry stations with said telephone connected to said central monitoring apparatus, whereby said apparatus communications with said telemetry station, said means for interconnecting said telemetry stations and said telephone associated therewith permits bilateral telemetry data transmission between said telemetry stations and said central monitoring apparatus, said interconnecting means being an acoustical coupling device, said central monitoring apparatus including means for permitting bilateral telemetry data transmission between said central monitoring apparatus and said telemetry stations, said bilateral transmission means being an acoustical coupling device, said means for analyzing the data transmission from said telemetry stations including a test apparatus having telemetry means identical to those employed in at least one of said telemetry stations, and means for interconnecting said acoustical coupling device and said test apparatus for permitting bilateral telemetry data transmission from said acoustical coupling device to said test apparatus and thus from said telemetry stations to said test apparatus.

2. A telemetry system in accordance with claim 1, wherein said means for interconnecting said acoustical coupling device and said test apparatus includes a frequency selective unit, and said frequency selective unit is operable to selectively pass data to said test apparatus.

3. A telemetry system in accordance with claim 2, wherein said frequency selective unit includes means for selectively varying the frequency selection thereof.

4. A telemetry system in accordance with claim 2, wherein said frequency selective unit comprises a plurality of individual frequency units, and each of said units is operable to pass data within a predetermined frequency range.

5. A telemetry system in accordance with claim 2, wherein said last mentioned interconnecting means includes a data recording means interposed between said acoustic coupling device and said frequency selective unit for recording data transmitted from said telemetry stations.

6. A telemetry system in accordance with claim 2, wherein said analyzing means also includes switching means connected to said acoustic coupling device, said switching means being operable to selectively transmit data from said acoustic coupling device to said data recording means, said frequency selective unit, and said data recording means and said frequency selective unit.

7. A telemetry system in accordance with claim 6, wherein said analyzing means includes a visual recording means connected to said frequency selective unit, said visual recording means being operable to visually display data transmitted by said telemetry stations.

8. A telemetry system in accordance with claim 7, wherein said test apparatus includes means for selectively interrogating said telemetry stations to ascertain the operational status thereof.

9. A telemetry system in accordance with claim 8, wherein said interrogation means comprises means for transmitting preprogrammed data to said telemetry stations for retransmission to said test apparatus, whereby said transmitted and retransmitted data are correlated by said test apparatus.

10. A telemetry system in accordance with claim 1, wherein said test apparatus includes means for detecting malfunctions of said telemetry stations.

11. A telemetry system in accordance with claim 9, wherein said detection means is also operable to isolate the malfunction of said telemetry stations.

* * * * *